United States Patent
Fuglevand et al.

(10) Patent No.: US 12,553,603 B2
(45) Date of Patent: Feb. 17, 2026

(54) BUILDING EMISSION PROCESSING AND/OR SEQUESTRATION SYSTEMS AND METHODS

(71) Applicant: NEXTWATTS, INC., Spokane, WA (US)

(72) Inventors: William A. Fuglevand, Spokane Valley, WA (US); Alfred T. Volberding, Kirkland, WA (US)

(73) Assignee: CARBONQUEST, INC., Spokane Valley, WA (US)

( * ) Notice: Subject to any disclaimer, the term of this patent is extended or adjusted under 35 U.S.C. 154(b) by 84 days.

(21) Appl. No.: 16/862,006

(22) Filed: Apr. 29, 2020

(65) Prior Publication Data

US 2020/0340665 A1 Oct. 29, 2020

Related U.S. Application Data

(60) Provisional application No. 62/977,050, filed on Feb. 14, 2020, provisional application No. 62/840,206, filed on Apr. 29, 2019.

(51) Int. Cl.
| | |
|---|---|
| *F23C 9/08* | (2006.01) |
| *B01D 53/54* | (2006.01) |
| *F22D 1/18* | (2006.01) |
| *F23J 15/06* | (2006.01) |
| *F23L 7/00* | (2006.01) |

(52) U.S. Cl.
CPC ............. *F23C 9/08* (2013.01); *B01D 53/54* (2013.01); *F22D 1/18* (2013.01); *F23J 15/06* (2013.01); *F23L 7/007* (2013.01); *B01D 2257/102* (2013.01)

(58) Field of Classification Search
None
See application file for complete search history.

(56) References Cited

U.S. PATENT DOCUMENTS

| | | | |
|---|---|---|---|
| 2,802,719 A | | 8/1957 | Avedikian |
| 4,283,212 A | | 8/1981 | Graham et al. |
| 4,284,055 A | | 8/1981 | Wakeman |
| 4,391,227 A | * | 7/1983 | Forster ............... F24H 9/18 122/18.2 |
| 4,484,933 A | | 11/1984 | Cohen |
| 4,823,710 A | | 4/1989 | Garrido et al. |
| 5,203,159 A | | 4/1993 | Koizumi et al. |
| 5,536,893 A | | 7/1996 | Gudmundsson |
| 6,170,264 B1 | * | 1/2001 | Viteri ............... F25J 3/04018 60/671 |

(Continued)

FOREIGN PATENT DOCUMENTS

| | | |
|---|---|---|
| CA | 2634256 | 7/2007 |
| CA | 2362773 | 12/2009 |

(Continued)

OTHER PUBLICATIONS

WO PCT/US2022/022853 Search Rept., Jul. 29, 2022, Carbonquest, Inc.

(Continued)

*Primary Examiner* — Jason Lau
(74) *Attorney, Agent, or Firm* — Wells St. John P.S.

(57) ABSTRACT

Systems and/or methods are provided for the capture of carbon dioxide from flue gas generated within a building.

8 Claims, 16 Drawing Sheets

(56) References Cited

U.S. PATENT DOCUMENTS

| | | |
|---|---|---|
| 7,056,482 B2 | 6/2006 | Hakka et al. |
| 7,594,956 B2 | 9/2009 | Knaebel |
| 7,727,374 B2 | 6/2010 | Jones |
| 8,226,917 B2 | 7/2012 | Fan et al. |
| 8,353,978 B2 | 1/2013 | Knaebel |
| 8,413,420 B1 | 4/2013 | Zaromb |
| 8,741,244 B2 | 6/2014 | Jones |
| 9,637,393 B2 | 5/2017 | Heidel et al. |
| 10,099,176 B2 | 10/2018 | Ateya Soliman |
| 10,676,799 B2 | 6/2020 | Berlowitz et al. |
| 10,718,055 B2 | 7/2020 | Ren et al. |
| 2002/0166323 A1 | 11/2002 | Marin et al. |
| 2004/0231332 A1 | 11/2004 | Saucedo et al. |
| 2005/0045030 A1 | 3/2005 | Tonkovich et al. |
| 2005/0199231 A1 | 9/2005 | Heider |
| 2005/0229871 A1 | 10/2005 | Robertson |
| 2006/0099110 A1 | 5/2006 | Shirakura |
| 2008/0121105 A1 | 5/2008 | Schubert et al. |
| 2008/0302133 A1 | 12/2008 | Saysset et al. |
| 2009/0214407 A1 | 8/2009 | Reyes et al. |
| 2009/0241490 A1 | 10/2009 | Lack |
| 2010/0083697 A1 | 4/2010 | Degenstein et al. |
| 2010/0180889 A1 | 7/2010 | Monzyk et al. |
| 2010/0198736 A1 | 8/2010 | Marino |
| 2010/0212555 A1 | 8/2010 | Yamada et al. |
| 2010/0288172 A1 | 11/2010 | Jukkola et al. |
| 2011/0005272 A1 | 1/2011 | Wijmans et al. |
| 2011/0195473 A1 | 8/2011 | Wilhelm |
| 2011/0293503 A1 | 12/2011 | Wright et al. |
| 2012/0060689 A1 | 3/2012 | Naumovitz et al. |
| 2012/0227644 A1 | 9/2012 | Uchida et al. |
| 2012/0285162 A1 | 11/2012 | Ahn et al. |
| 2013/0202517 A1 | 8/2013 | Ayala et al. |
| 2013/0247886 A1 | 9/2013 | Hamad et al. |
| 2013/0283852 A1 | 10/2013 | Sipocz et al. |
| 2013/0323657 A1 | 12/2013 | Ludwig et al. |
| 2014/0041562 A1 | 2/2014 | Grubbstrom |
| 2014/0089078 A1 | 3/2014 | Dessert et al. |
| 2014/0116358 A1* | 5/2014 | Stallmann ............... B01D 53/75 122/23 |
| 2014/0194539 A1 | 7/2014 | Hammad et al. |
| 2014/0261245 A1 | 9/2014 | Patrick et al. |
| 2014/0287235 A1 | 9/2014 | Chang et al. |
| 2014/0298996 A1 | 10/2014 | Meirav et al. |
| 2015/0047989 A1 | 2/2015 | Huang |
| 2015/0079526 A1 | 3/2015 | Lou et al. |
| 2015/0190748 A1* | 7/2015 | Liu ....................... F01K 23/067 96/4 |
| 2015/0329369 A1 | 11/2015 | Heidel et al. |
| 2015/0360168 A1* | 12/2015 | Zubrin ................. B01D 53/04 96/127 |
| 2016/0305655 A1* | 10/2016 | Tulokas ................ F23D 17/002 |
| 2016/0356489 A1 | 12/2016 | Matsumoto et al. |
| 2016/0363368 A1 | 12/2016 | Zanganeh et al. |
| 2017/0003246 A1* | 1/2017 | Shuk .................. G01N 27/4075 |
| 2017/0138222 A1 | 5/2017 | Sundaram et al. |
| 2017/0271701 A1 | 9/2017 | Berlowitz et al. |
| 2017/0341942 A1 | 11/2017 | Harper, Jr. |
| 2018/0104668 A1 | 4/2018 | Tan et al. |
| 2020/0009494 A1 | 1/2020 | Ritter et al. |
| 2020/0027096 A1 | 1/2020 | Cooner |
| 2020/0148038 A1 | 5/2020 | Kujak et al. |
| 2020/0203738 A1 | 6/2020 | Jolly et al. |
| 2021/0048835 A1 | 2/2021 | Brown |
| 2021/0116144 A1 | 4/2021 | Morgan et al. |
| 2021/0325064 A1 | 10/2021 | Amhamed et al. |
| 2022/0011731 A1 | 1/2022 | Risbeck et al. |
| 2022/0358515 A1 | 11/2022 | Kahn et al. |
| 2022/0390137 A1 | 12/2022 | Wenzel et al. |
| 2023/0125924 A1 | 4/2023 | Nawaz et al. |
| 2023/0201757 A1 | 6/2023 | Alissa et al. |
| 2023/0256388 A1 | 8/2023 | Fuglevand et al. |
| 2023/0265794 A1 | 8/2023 | Callahan |

FOREIGN PATENT DOCUMENTS

| | | | |
|---|---|---|---|
| CA | 2559081 | 12/2012 | |
| CA | 3022534 | 2/2017 | |
| CN | 201507941 | 6/2010 | |
| CN | 106025313 | 10/2016 | |
| CN | 107355680 | 11/2017 | |
| DK | 2615264 | 8/2016 | |
| EP | 2950911 | 12/2015 | |
| JP | H0699034 | 4/1994 | |
| JP | 2000317302 A * | 11/2000 | |
| JP | 2011-247533 | 12/2011 | |
| KR | 10-1038439 | 6/2011 | |
| KR | 2013-0047109 | 5/2013 | |
| WO | WO 02/09849 | 2/2002 | |
| WO | WO 2009/070785 | 6/2009 | |
| WO | WO 2010/068924 | 6/2010 | |
| WO | WO 2010/139903 | 12/2010 | |
| WO | WO 2014/127913 | 8/2014 | |
| WO | WO 2014/207035 | 12/2014 | |
| WO | WO 2016/205303 | 12/2016 | |
| WO | WO 2017/003715 | 1/2017 | |
| WO | WO 2017/116307 | 7/2017 | |
| WO | WO 2017/163549 | 9/2017 | |
| WO | WO-2017163549 A1 * | 9/2017 | ........... B01D 53/047 |
| WO | WO 2017/189238 | 11/2017 | |
| WO | WO 2020/219907 | 10/2020 | |
| WO | WO 2021/096958 | 5/2021 | |
| WO | WO 2021/156457 | 8/2021 | |
| WO | WO 2022/087265 | 4/2022 | |
| WO | WO 2022/094124 | 5/2022 | |
| WO | WO 2022/212719 | 10/2022 | |
| WO | WO 2022/266377 | 12/2022 | |
| WO | WO 2023/212246 | 11/2023 | |

OTHER PUBLICATIONS

WO PCT/US2022/022853 Writ. Opin., Jul. 29, 2022, Carbonquest, Inc.

Poola et al., "Study of Using Oxygen-Enriched Combustion Air for Locomotive Diesel Engines", CONF-961017-7, available online at https://digital.library.unt.edu/ark:/67531/metadc674816/m2/1/high_res_d/392758.pdf, 1996, 13 pages.

WO PCT/US2020/030533 IPRP, Nov. 11, 2021, Nextwatts, Inc.

WO PCT/US2021/057111 Search Rept., Mar. 1, 2022, Nextwatts, Inc.

WO PCT/US2021/057111 Writ. Opin., Mar. 1, 2022, Nextwatts, Inc.

WO PCT/US2022/022853 Inv Pay Fees, May 24, 2022, Carbonquest, Inc.

WO PCT/US2020/030533 Search Rept., Sep. 11, 2020, Nextwatts, Inc.

WO PCT/US2020/030533 Writ. Opin., Sep. 11, 2020, Nextwatts, Inc.

Asco, "CO2 Production Plants", available online at https://www.ascoco2.com/fileadmin/PDF_Download/PDF_Produkte/PDF_CO2_Produktion_und_Rueckgewinnung/en/ASCO_CO2_Production_Plants.pdf, Oct. 2017, 4 pages.

Asco, "CO2 Stack Gas Recovery Systems", available online at https://www.ascoco2.com/fileadmin/PDF_Download/PDF_Produkte/PDF_CO2_Produktion_und_Rueckgewinnung/en/ASCO_CO2_Stack_Gas_Recovery_Systems.pdf, Aug. 2018, 4 pages.

Asco, "CO2 Storage and Transport", available online at https://www.ascoco2.com/en/co2-and-dry-ice-equipment/co2-storage/, Mar. 12, 2019, 5 pages.

Asco, "CO2: Industrial Gases", available online at https://www.ascoco2.com/en/co2-production-and-co2-recovery-plants/industries/industrial-gases/, Mar. 12, 2019, 4 pages.

Fluor, "Carbon Capture Recovery Technologies for Flue Gas Streams Reduce Greenhouse Gas Emissions", available online at https://www.fluor.com/client-markets/energy-chemicals/carbon-capture, Mar. 12, 2019, 2 pages.

Fluor, "Econamine FG Plus", available online at https://www.fluor.com/about-fluor/corporate-information/technologies/fluor-econamine-fg-plus, Mar. 12, 2019, 2 pages.

(56) References Cited

OTHER PUBLICATIONS

Global CCS Institute, "Liquid CO2 Collection Network", available online at https://hub.globalccsinstitute.com/publications/co2-liquid-logistics-shipping-concept-llsc-overall-supply-chain-optimization/52-liquid, Mar. 14, 2019, 4 pages.

Qnergy, "Power Conversion Kit: PCK80", available online at https://www.qnergy.com/wp-content/uploads/2017/12/Download-the-PCK80-Brochure-Spec -Sheet.pdf, 2017, 2 pages.

Rinprasertmeechai et al., "Carbon Dioxide Removal from Flue Gas Using Amine-Based Hybrid Solvent Absorption", International Journal of Chemical and Molecular Engineering vol. 6, No. 4, 2012, United States, pp. 284-288.

WO PCT/US22/033871 Search Rpt., Nov. 7, 2022, Carbonquest, Inc.
WO PCT/US22/033871 Written Op., Nov. 7, 2022, Carbonquest, Inc.
WO PCT/US2022/033871 Inv. Pay Fee, Sep. 7, 2022, Carbonquest, Inc.
EP 20798450 Supp. Search Rept, May 17, 2023, Carbonquest, Inc.
WO PCT/US2021/057111 IPRP, May 11, 2023, Carbonquest, Inc.
WO PCT/US2023/011863 Srch. Rept., Apr. 14, 2023, Carbonquest, Inc.
WO PCT/US2023/011863 Writ.Opin., Apr. 14, 2023, Carbonquest, Inc.
WO PCT/US2023/018080 Inv.PayFees, Jun. 2, 2023, Carbonquest, Inc.
WO PCT/US2023/020278 Search Rpt, Jul. 21, 2023, Carbonquest, Inc.
WO PCT/US2023/020278 Written Opin, Jul. 21, 2023, Carbonquest, Inc.
WO PCT/US2022/022853 IPRP, Oct. 12, 2023, Carbonquest, Inc.
WO PCT/US2023/018080 Search Rpt, Aug. 15, 2023, Carbonquest, Inc.
WO PCT/US2023/018080 WrittenOpin., Aug. 15, 2023, Carbonquest, Inc.
WO PCT/US2024/027659 Search Rpt, Sep. 11, 2024, Carbonquest, Inc.
WO PCT/US2024/027659 Wrt. Opin., Sep. 11, 2024, Carbonquest, Inc.
WO PCT/US2023/011863 IPRP, Aug. 15, 2024, Carbonquest, Inc.
WO PCT/US2024/025729 Search Rpt, Aug. 27, 2024, Carbonquest, Inc.
WO PCT/US2024/025729 Writ.Opin., Aug. 27, 2024, Carbonquest, Inc.
WO PCT/US2024/037666 Inv Pay Fees, Sep. 3, 2024, Carbonquest, Inc.
EP EP 21887548 Extend. Search Rpt, Jan. 8, 2025, Carbonquest, Inc.
WO PCT/US23/018080 IPRP, Apr. 24, 2025, Carbonquest, Inc.
WO PCT/US24/056728 Search Rept., Feb. 25, 2025, Carbonquest, Inc.
WO PCT/US24/056728 Writ. Opin., Feb. 25, 2025, Carbonquest, Inc.
Qazvini et al., "MUF-16: A Robust Metal-Organic Framework for Pre- and Post-Combustion Carbon Dioxide Capture", ACS Applied Materials & Interfaces, vol. 13, Mar. 4, 2021, pp. 12141-12148.
EP EP 22782222 Partial Srch Rpt., Apr. 25, 2025, Carbonquest, Inc.
WO PCT/US25/020362 Invit. Pay Fee, May 9, 2025, Carbonquest, Inc.
WO PCT/US25/020362 Search Rept, Jul. 18, 2025, Carbonquest, Inc.
WO PCT/US25/020362 Written Opin., Jul. 18, 2025, Carbonquest, Inc.
WO PCT/US2022/033871 IPRP, Dec. 28, 2023, Carbonquest, Inc.
WO PCT/US2024/027659 Inv Pay Fees, Jul. 1, 2024, Carbonquest, Inc.
WO PCT/US24/056728 Invit. Pay Fees, Jan. 3, 2025, Carbonquest, Inc.
WO PCT/US2023/020278 IPRP, Nov. 7, 2024, Carbonquest, Inc.
WO PCT/US2024/037666 Search Rpt., Sep. 11, 2024, Carbonquest, Inc.
WO PCT/US2024/037666 Writ. Opin., Oct. 24, 2024, Carbonquest, Inc.

\* cited by examiner

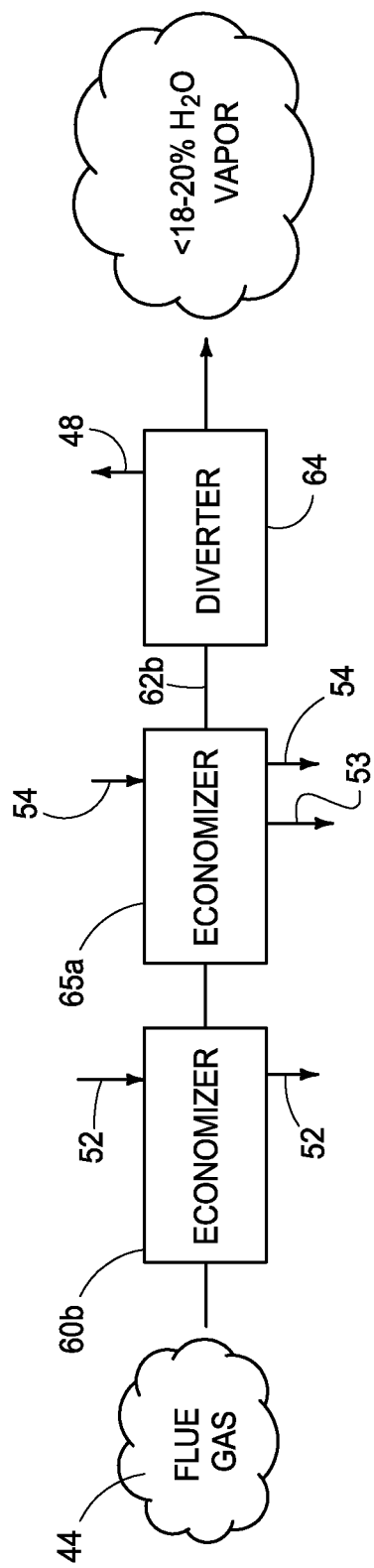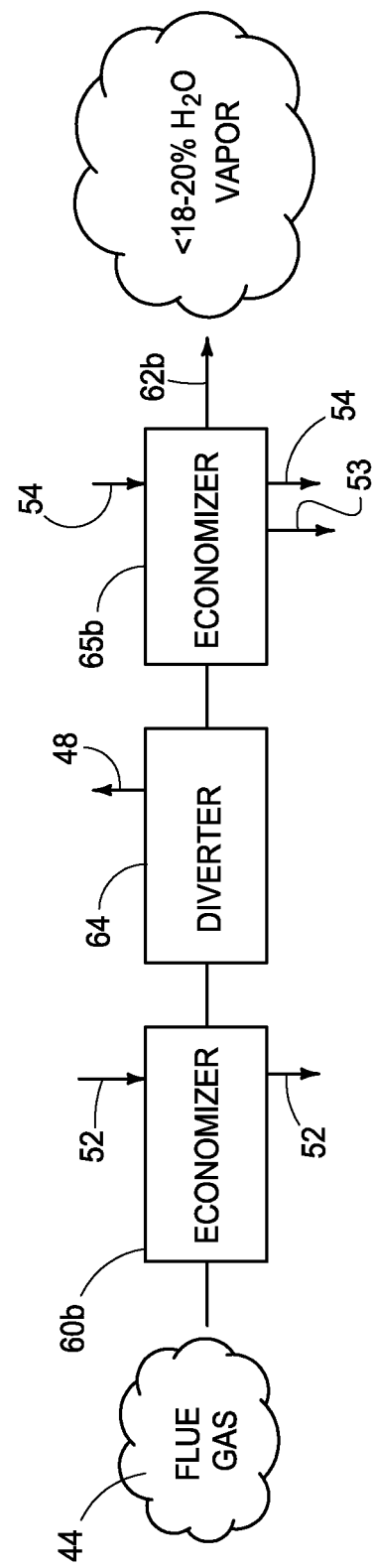
FIG. 4B
FIG. 4C

BUILDING EMISSION PROCESSING AND/OR SEQUESTRATION SYSTEMS AND METHODS

CROSS REFERENCE TO RELATED APPLICATION

This application claims priority to and the benefit of U.S. Provisional Patent Application Ser. No. 62/840,206 filed Apr. 29, 2019, entitled "Building Carbon Dioxide Sequestration Systems and Methods" and U.S. Provisional Patent Application Ser. No. 62/977,050 filed Feb. 14, 2020, entitled "Building Emission Processing and/or Sequestration Systems and Methods", the entirety of each of which is incorporated by reference herein.

TECHNICAL FIELD

The field of the invention relates to the processing of building emissions that can include carbon dioxide management systems and methods, and more particularly, be utilized by multi-story or large footprint buildings that utilize large combustion energy sources for building systems such as steam heating and hot water with byproduct generation of emissions.

BACKGROUND

Carbon dioxide generation in buildings, particularly in large metropolitan areas, is a significant contributor to carbon dioxide generation overall. Carbon dioxide is currently listed as a global warming compound whose reduction is sought worldwide. The generation of carbon dioxide is a necessary part of respiration, which is a necessary part of life, but it is important to limit the generation of carbon dioxide in an effort to address climate change. The present disclosure provides building emission processing and sequestration systems that can address carbon dioxide generation from combustion of fossil fuels and proliferation thereof in metropolitan areas.

SUMMARY

Systems or methods for operating a combustion boiler within a building are provided. The systems or methods can include: providing air and fuel to a combustion burner; combusting the air and fuel within the combustion burner; monitoring the amount of free oxygen in the burner; and controlling the amount of air and fuel provided to the burner to maintain a free oxygen amount of about 3%. The systems or methods can include: combusting air and fuel within a burner to produce flue gas having an oxygen concentration; and restricting air from the flue gas by substantially eliminating tramp air within the conduit operably aligned to convey flue gas from the burner.

Systems or methods for cooling flue gas from a combustion boiler within a building are provided. The systems or methods can include providing the flue gas to at least one economizer having at least one set of cooling coils conveying the boiler feed water, the providing cooling the flue gas and heating the boiler feed water.

Systems or methods for separating carbon dioxide from flue gas generated from a combustion boiler within a building are provided. The systems or methods can include: providing flue gas comprising less than about 3% water; compressing the flue gas; and cooling the compressor with a heat transfer fluid and providing the heat transfer fluid to/from a chiller and/or a cooling tower. The systems or methods can include: compressing the flue gas; and drying the flue gas using nitrogen recovered during separation of carbon dioxide recovered from the flue gas. The systems or methods can include: removing at least some of the nitrogen from the flue gas to produce greater than about 95% carbon dioxide using a pressure swing adsorption assembly; and using the nitrogen removed from the flue gas to remove water from the flue gas before providing the flue gas to the pressure swing adsorption assembly. The systems or methods can include: removing at least some of the nitrogen from the flue gas to produce greater than about 95% carbon dioxide using a pressure swing adsorption assembly; and providing at least some of the nitrogen removed from the flue gas to a gas expander/generator. The systems or methods can include: removing at least some of the nitrogen from the flue gas to produce greater than 95% carbon dioxide using a pressure swing adsorption assembly; and providing the at least some of the nitrogen removed from the flue gas to both a dryer and an expander/generator, or to a dryer and control valve. The control valve may or may not be equipped with a silencer.

System or methods for cooling carbon dioxide separated from flue gas generated from a combustion boiler within a building are provided. The system or methods can include: separating nitrogen from flue gas using a pressure swing adsorption assembly; expanding the nitrogen through a turbine expander within the presence of a heat exchanger to cool fluid within the heat exchanger; and transferring that cooled fluid to another heat exchanger operably aligned with the carbon dioxide product of the pressure swing adsorption assembly to cool the carbon dioxide product.

System or methods for liquefying carbon dioxide separated from flue gas generated from a combustion boiler within a building are provided. The system or methods can include providing the gaseous carbon dioxide through a sparge assembly into liquid carbon dioxide within a storage vessel.

Buildings utilizing a carbon fuel source and generating carbon emission upon combustion of the carbon fuel source are provided. Building emissions can be operably coupled to a carbon capture system, the system configured to separate and condense carbon dioxide from the carbon emission. The system can be configured to process the carbon emission and return heat to the building. The system can be configured to process the carbon emission and generate electricity. The system can be configured to process the carbon emission and store electrical energy. The system can be configured to dynamically control the combustion and capture systems to reduce carbon combustion and increase carbon capture.

DRAWINGS

Embodiments of the disclosure are described below with reference to the following accompanying drawings.

FIG. 4B is a portion of a carbon dioxide capture method and/or system according to another embodiment of the disclosure.

FIG. 4C is a portion of a carbon dioxide capture method and/or system according to another embodiment of the disclosure.

DESCRIPTION

This disclosure is submitted in furtherance of the constitutional purposes of the U.S. Patent Laws "to promote the progress of science and useful arts" (Article 1, Section 8).

Figure 1:
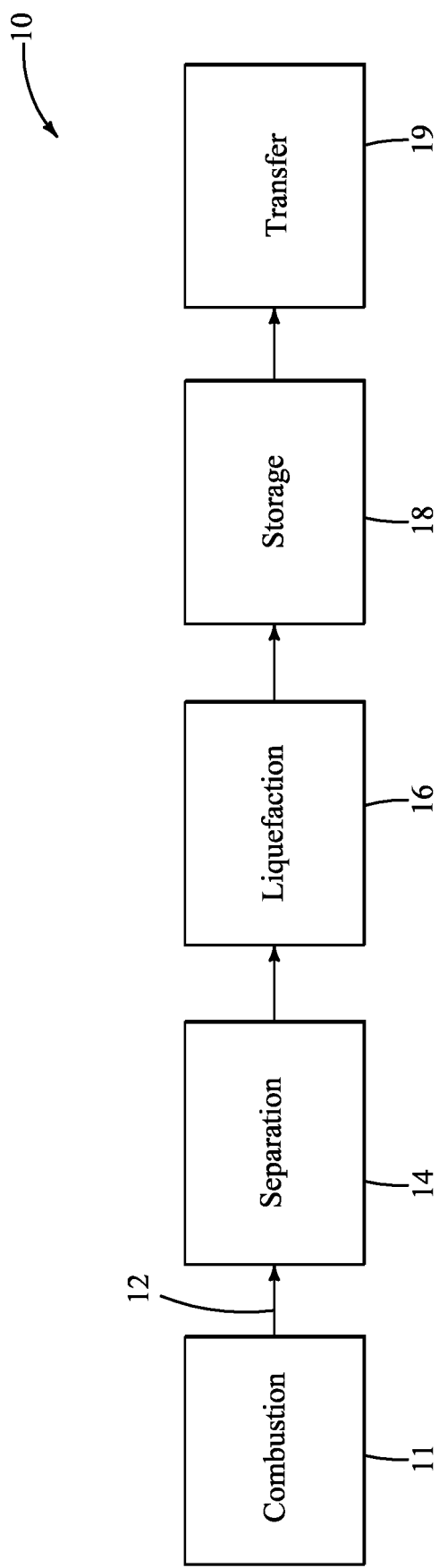
FIG. 1 is a carbon dioxide capture method and/or system according to an embodiment of the disclosure.

The present disclosure will be described with reference to FIGS. 1-12B. The systems and methods of the present disclosure can be operated unattended and/or continuously within a building for up to ten years with only minor periodic maintenance. Referring first to FIG. 1, a system 10 is provided that includes a source of flue gas, such as a boiler that combusts air and fuel to produce flue gas. Flue gas 12 can include typical combustion products from heating and/or cooling systems of a building. These buildings can be considered buildings that are commercial, residential, and/or industrial. System 10 can rely on combustion of fossil fuels. These fossil fuels can include oil, and/or natural gas. Upon combustion of fuel, $CO_2$ as part of flue gas can be produced. In the case of natural gas combustion, system 10 can generate at least about 10% $CO_2$ and about 18% water. Systems and/or methods of the present disclosure can include a portion 14 for separation, a portion 16 for liquefaction, a portion 18 for storage, and a portion 19 for transfer of $CO_2$.

In accordance with example implementations, at least about 600 standard cubic feet per minute of building flue gas can be diverted to the flue gas process stream where $CO_2$ is separated and purified in component 14 of system 10. This separation/purification component can be an adsorption purification system, operated under conditions of Pressure Swing (PSA), Temperature Swing (TSA), or Electrical Swing (ESA), or any combination thereof. In accordance with example implementations, it can be a Pressure Swing Adsorption system that is a multicomponent adsorption system that includes multiple vessels containing layered solid phase adsorbent materials coupled and/or configured to work in concert to provide greater than 85% $CO_2$ recovery. These multicomponent adsorption systems can remove carbon dioxide from an essentially "dry" flue gas stream to a purity of greater than 95% in most cases, and in other cases, at least 99%. This purified carbon dioxide gas can then be liquified with successive cooling and compression steps to effect phase change to form liquid carbon dioxide in liquefaction component 16, and then providing that liquified carbon dioxide to a storage component 18 for scheduled removal as desirable. In accordance with example implementations, this liquified carbon dioxide can be transferred away in transfer component 19, and the transfer can be provided to another source such as a storage facility which can distribute the carbon dioxide for use in applications such as concrete curing, waste water treatment, other carbon dioxide sequestration methods, recycled for fire suppression systems, industrial specialty gas, consumed in production of hybrid fuels and organic intermediate chemicals, or for beverage carbonation, as a few examples.

Figure 2:
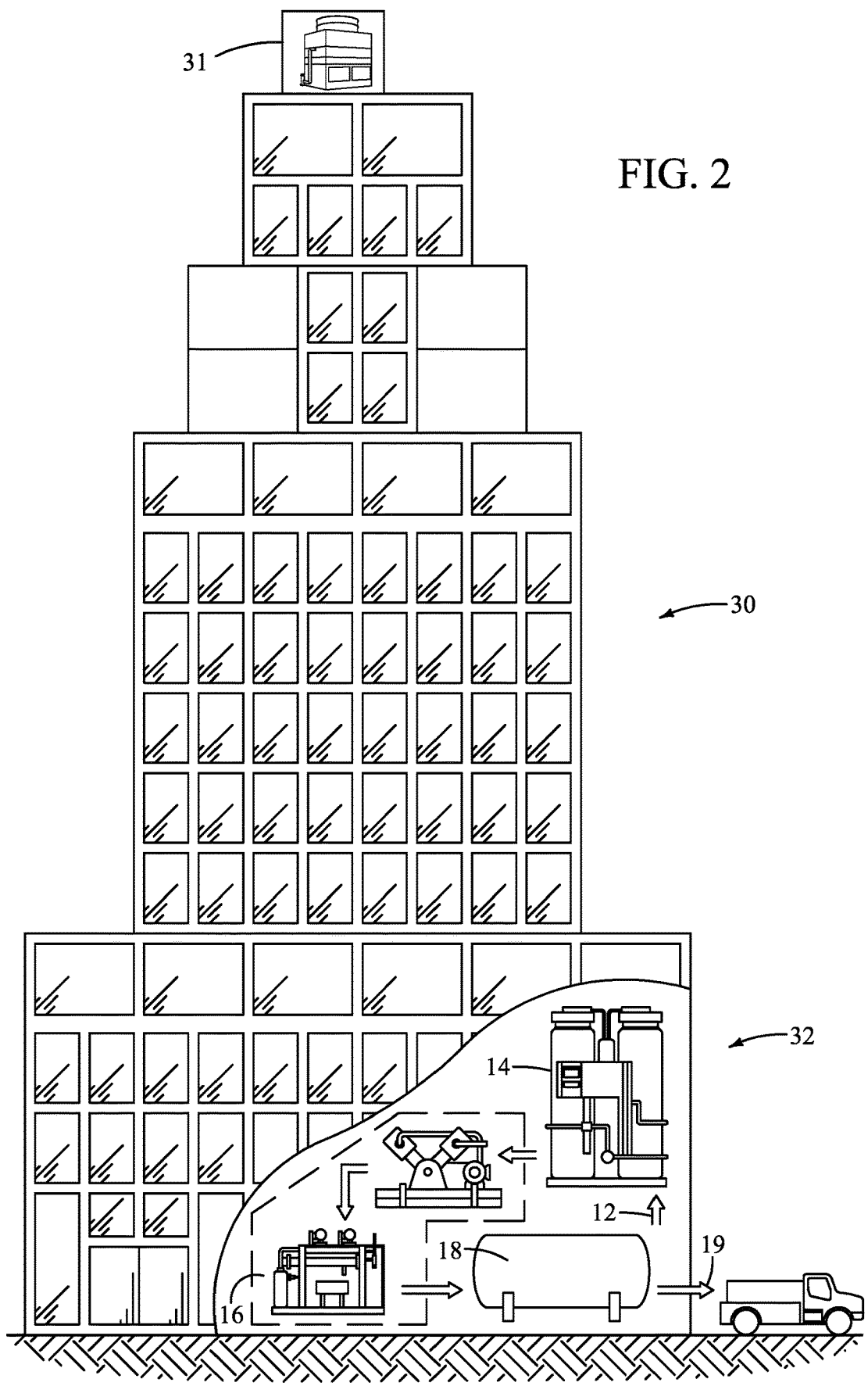
FIG. 2 is a carbon dioxide capture method and/or system according to another embodiment of the disclosure.

Referring next to FIG. 2, a building system 30 is shown having system 32 therein. Flue gas 12 is provided to a series of portions of system and/or methods 14, 16, 18, 19 and/or cooling tower 31 for the capture of $CO_2$ from flue gas generated by the building.

Figure 3A:
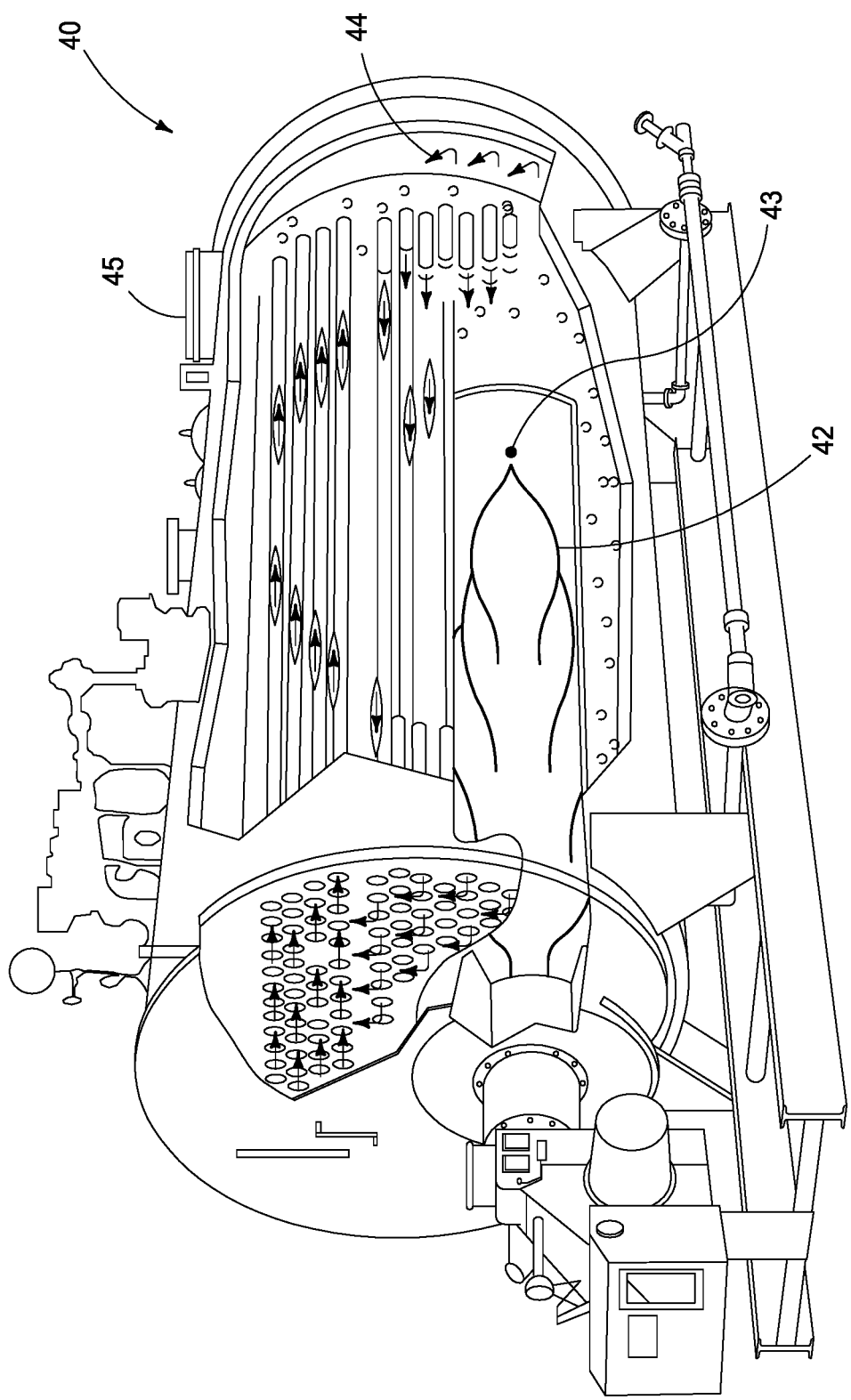
FIG. 3A is an example boiler equipped with a free oxygen sensor according to an embodiment of the disclosure.
Figure 3B:
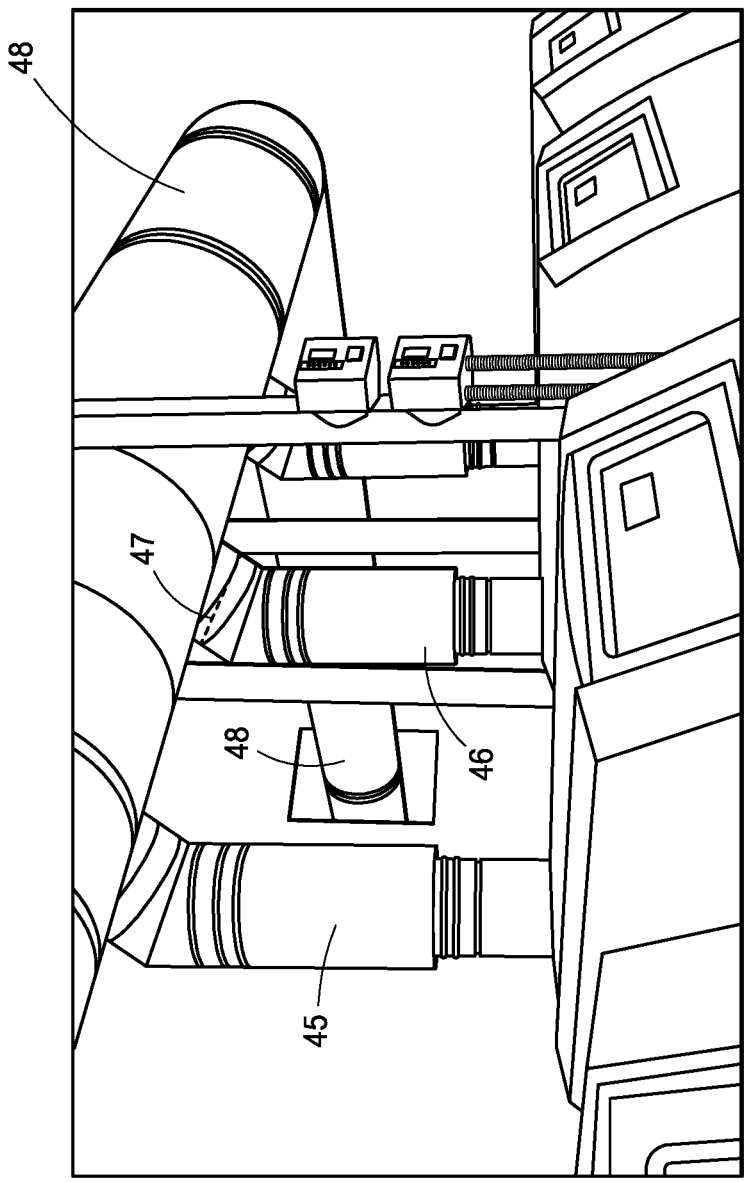
FIG. 3B is a configuration of example boilers operably coupled to a plenum according to an embodiment of the disclosure.
Figure 3C:
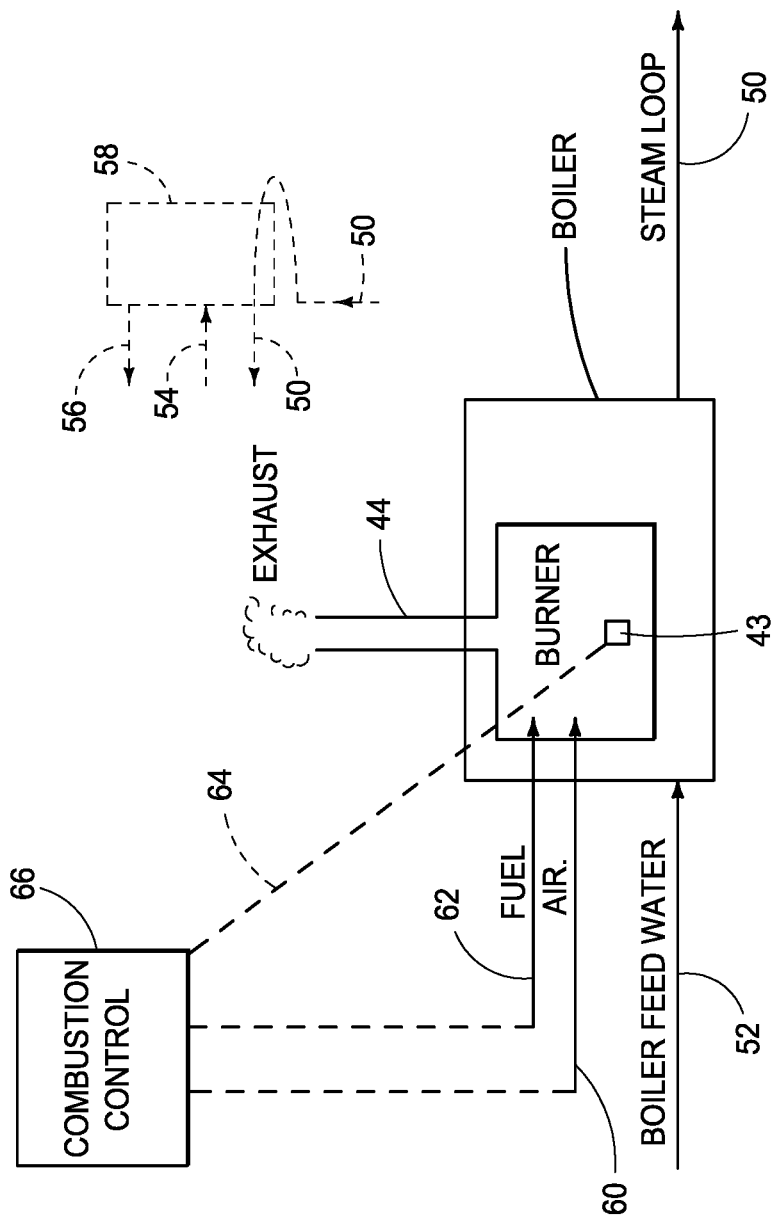
FIG. 3C is an example boiler equipped with a free oxygen sensor according to an embodiment of the disclosure.

Referring next to FIGS. 3A-3C, example boiler configurations are shown as part of the systems and/or methods of the present disclosure. Referring first to FIG. 3A, a boiler 40 is shown generating combustion 42 in the presence of a free oxygen sensor 43. Combustion 42 generates flue gas 44 which is provided to a boiler exhaust 45. Referring to FIG. 3B, boiler exhaust is operatively coupled with a plenum 48. In this depicted configuration, multiple boilers are shown, each with an exhaust 45 and 46, for example, each exhaust operatively coupled to plenum 48.

Referring next to FIG. 3C, a boiler configured with the systems and/or methods of the present disclosure is depicted. Accordingly, air 60 and fuel 62 can be provided to the combustion burner, the mix of which and accordingly the burn of which is controlled by combustion controller 66 which is operably connected with free oxygen sensor 43. Accordingly, boiler feed water 52 is received by the combustion boiler and heated to hot water or steam 50 which is used to heat the building and/or building systems such as water heater 58. Water heater system 58 can be configured to receive potable water for heating and/or industrial process water for heating.

In accordance with example implementations, control 66 can utilize sensor 43 to monitor the amount of free oxygen in the combustion burner and maintain the amount of free oxygen to about 3%. About 3% free oxygen can include free oxygen from 3 to 7%. In accordance with example implementations, combustion can generate flue gas 44. The composition of flue gas 44 can be controlled to include at least about 10% carbon dioxide. About 10% carbon dioxide can include carbon dioxide from 9 to 12% of the flue gas from combustion of natural gas. System 10 can be utilized to combust fuels other than natural gas which may dictate other optimal $CO_2$ flue gas concentrations. Accordingly, system 10 can be configured to utilize multiple fuels.

The systems and/or methods of the disclosure can include separating the carbon dioxide from the flue gas, liquefying the carbon dioxide after separating the carbon dioxide from the flue gas, liquefying the separated carbon dioxide after separating the carbon dioxide from the flue gas, storing the carbon dioxide after liquefying the carbon dioxide, and/or transporting the carbon dioxide after storing the carbon dioxide.

Referring to both FIGS. 3B and 3C, systems and/or methods for operating the combustion boiler within the building are provided that can include combusting air and fuel within the burner to produce flue gas 44 having an oxygen concentration; and restricting air from the flue gas by substantially eliminating tramp air within the conduit operably aligned to convey flue gas from the burner. In accordance with example implementations, in the case of multiple boilers as shown in FIG. 3B, exhausts 45 and 46 can be operatively aligned with plenum 48. Exhausts not in use, such as 46, can be a source of tramp air to the plenum. In accordance with example implementations, the systems and/or methods of the present disclosure can include providing fluid communication between the operating burner of one boiler and the plenum while restricting fluid communication between the plenum and an idle burner of the other operating boiler. In at least one configuration, a door or divider 47 can be provided and operable to eliminate tramp air from the exhaust of the idle burner.

In accordance with at least one aspect of the present disclosure, real time control of the combustion source, or boiler, can achieve higher efficiency to reduce consumption of natural gas or fuel, for example, while increasing the concentration of carbon dioxide in the flue gas. This may be considered counter intuitive to increase the concentration of carbon dioxide in the flue gas when the systems and/or methods of the present disclosure are being utilized to reduce carbon emissions from a building. However, increasing carbon dioxide concentration can provide the benefit of decreasing fuel consumption by reducing heat loss through the exhaust. Adjusting combustion to control free oxygen to 3% can give a higher efficiency burn. In accordance with example implementations, through combustion control, it is desirable to approach the 12% concentration value of $CO_2$, when burning natural gas, and achieve at least about 10% carbon dioxide concentration of the flue gas. This is at least one feature of the disclosed building emission processing systems and/or methods and can be utilized as one of the initial steps in carbon capture.

Within the building, boiler operation can be dictated by responding to the need for hot water or steam by controlling the combustion burner to various predetermined firing rates; 1) an off condition, 2) a low fire rate, and/or 3) a high fire rate. These rates may have been established on older boilers through calibrated mechanical linkages, for example. Recognizing that cyclic boiler operation will vary widely from hour to hour, day to day, and season to season, it is desired to establish automatic control of the flame rate continuously across the entire boiler load range, while also controlling free oxygen as discussed above. The systems and/or methods of the present disclosure can be configured to reduce on-off cycles by extending boiler run time at a reduced flame rate, increasing the life on the boilers, and providing a more continuous flow of flue gas to the separation, liquefaction, storage and/or transport systems and/or methods of present disclosure.

Accordingly, the boiler and system controls (for example FIG. 11) can achieve higher building thermal efficiency, while creating optimal conditions for flue gas supply to the systems and methods of the present disclosure.

Figure 4A:
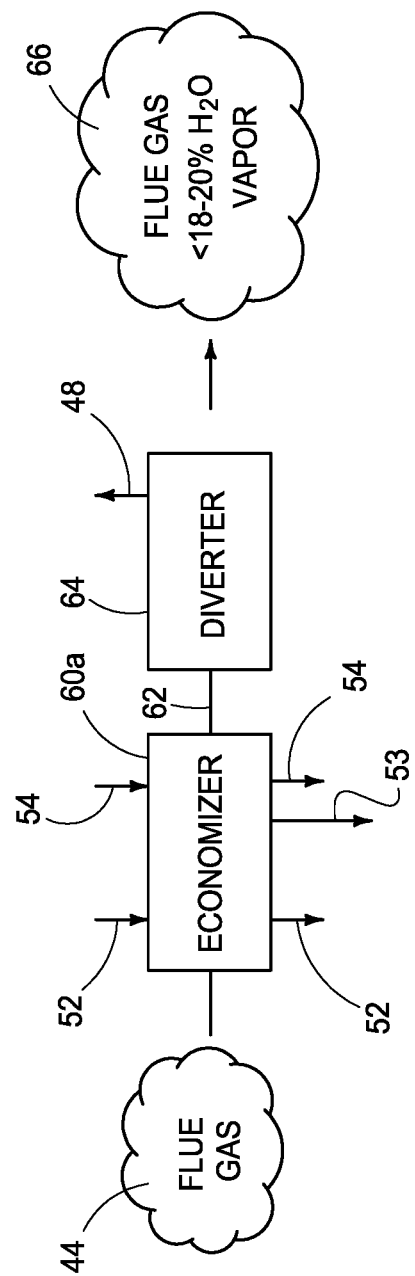
FIG. 4A is a portion of a carbon dioxide capture method and/or system according to an embodiment of the disclosure.

Referring next to FIGS. 4A-C, multiple portions of systems and methods are depicted for separating water from flue gas as well as cooling the flue gas. Referring first to FIGS. 4A-4C, three different configurations of systems and/or methods for cooling flue gas from a combustion boiler within a building are depicted. Referring first to FIG. 4A, flue gas 44 can proceed to a combination non-condensing and condensing economizer 60a. Flue gas 44 first proceeds to a non-condensing configuration in which boiler feed water 52 is provided through a conduit, set of conduits, and/or coils and flue gas is cooled and the boiler feed water heated. Accordingly, methods for cooling flue gas from a combustion boiler within a building are provided. Upon heating the boiler feed water, it can be provided to the boiler thus lowering the necessary energy required to heat the feed water to hot water and/or steam.

Figure 6:
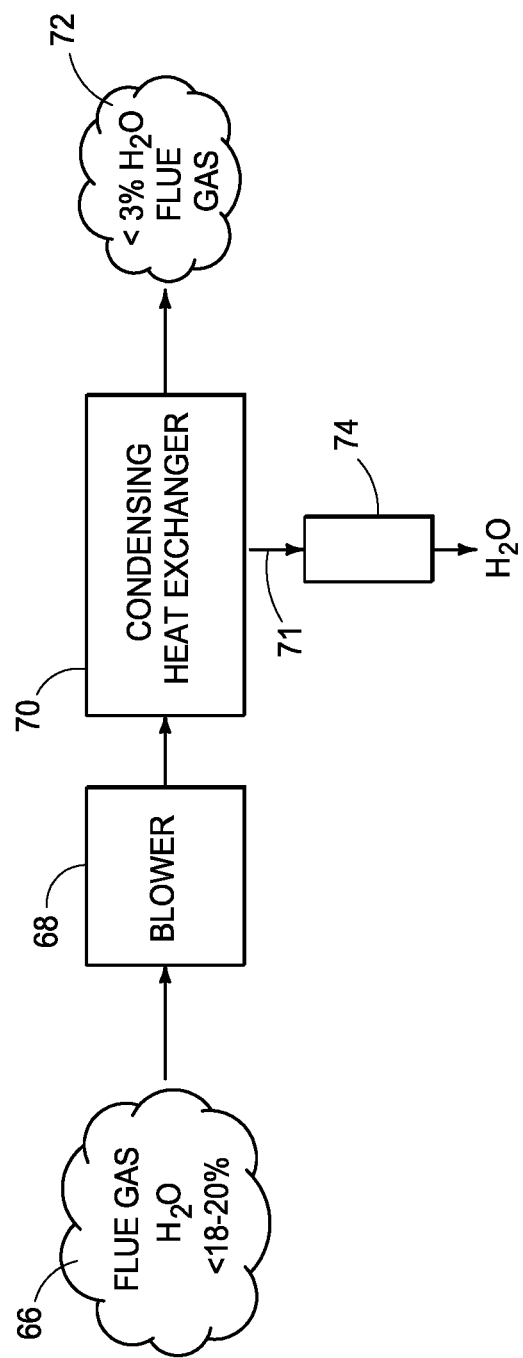
FIG. 6 is a portion of a carbon dioxide capture method and/or system according to an embodiment of the disclosure.

Additionally, the economizer can be configured for condensing. Accordingly, a conduit, set of conduits, or coils 54 can be configured to convey potable or industrial process water that is received from a utility for example. This water can have the temperature close to that of ground water as it is conveyed through typically underground pipes. Accordingly, the water has a substantially different temperature than the flue gas, even after being partially cooled in the non-condensing economizer. The providing of the flue gas to these conduits can remove water from the flue gas thus creating a water condensate effluent 53. This water proceeding through the conduits can be heated and provided to a water heating system 58 (FIG. 3C) as water heating system water intake 54, heated and received through outlet 56. Accordingly, the amount of energy needed to heat the water within water heating system 58 is less for at least the reason the water received for heating does not need to be heated from the lower temperature associated with typical utility water, rather it had been preheated. In accordance with an alternative configuration, and with reference to FIG. 4B, one set of coils 52 can be associated with one economizer 60b, and another set of coils 54 can be associated with another economizer 65a. In this configuration, economizer 60b can be a non-condensing economizer and economizer 65a can be configured as a condensing economizer. In accordance with another embodiment of the disclosure, a diverter 64 can be operably coupled to the economizers as shown in FIGS. 4A-4C. In accordance with example implementations, the cooled flue gas can be provided from diverter 64 using a blower. The systems and/or methods can control the amount of flue gas to be processed using the diverter. In accordance with example implementations, the current system in accordance with FIG. 4C is going to receive 450 Standard Cubic Feet per Minute (SCFM) to 500 SCFM of wet flue gas 44. This diverter can be controlled by the overall master system (FIG. 11) which can control the motor operated butterfly valve within the diverter. The master system can also collect gas temperature and flow data, and operate the blower as shown in FIG. 6.

Figure 5A:
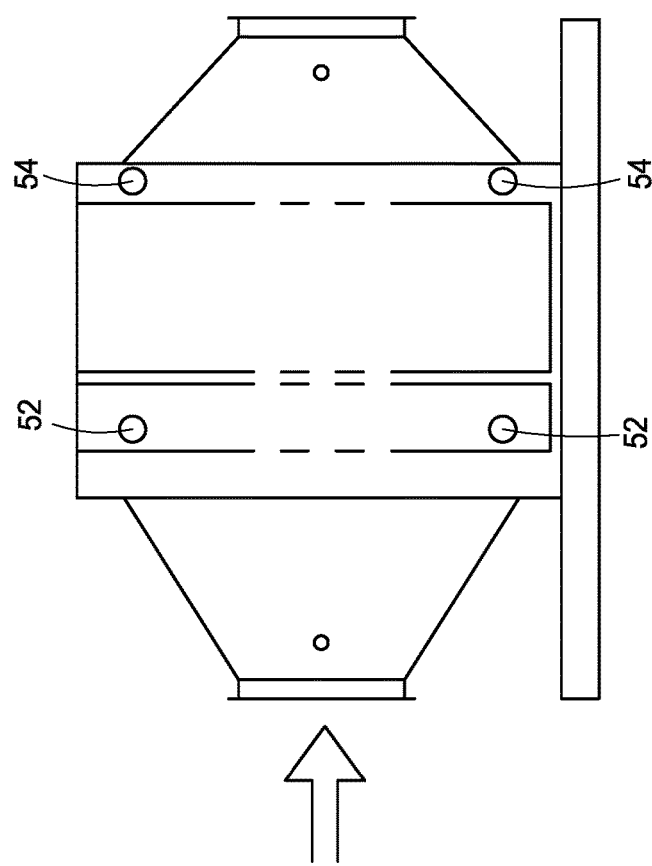
FIG. 5A is an example configuration of a component of a carbon dioxide capture method and/or system according to an embodiment of the disclosure.
Figure 5B:
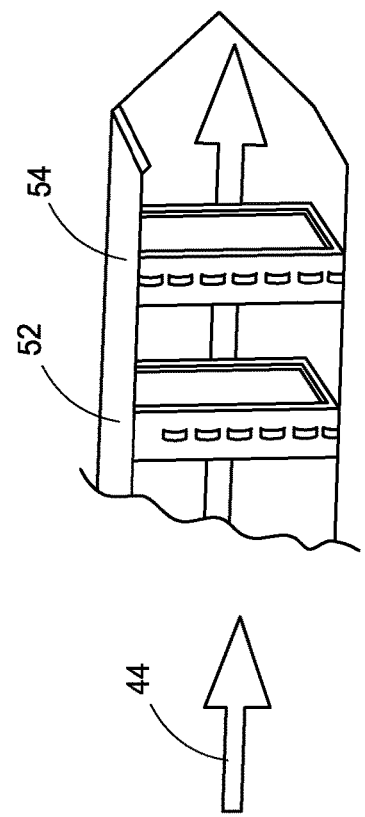
FIG. 5B is another example configuration of a component of a carbon dioxide capture method and/or system according to an embodiment of the disclosure.

Accordingly, where an economizer is down process stream from a diverter, a blower may precede the economizer. In accordance with example implementations, the flue gas is at least about 10% carbon dioxide and/or at least about 3% free oxygen prior to entering the first economizer. The systems and/or methods of the present disclosure can utilize economizers configured as shown in FIGS. 5A and 5B for example, and the methods can include additional separation as well as liquefaction, storage, and transport.

It has been determined that flue gas from the boiler may have a water content of approximately 18%, and a temperature ranging up to 350° F. Prior to separation of $CO_2$, this water can be substantially removed from the flue gas. This involves dropping the flue gas temperature below dewpoint and allowing water to condense out as a liquid. As the water content of the flue gas lowers, so does the dewpoint, requiring yet additional cooling to continue removing the water. This cooling can result in flue gas condensates.

Flue gas condensates tend to be slightly acidic (at pH<=5) which is a condition that can damage some building plenums due to construction materials (such as carbon steel) which are not acid resistant. In these cases, gas must be removed from the plenum and condensed in external heat exchangers having acid resistant stainless steel components. Additionally, depending on condenser design, some amount of micro-liquid particles may remain in the gas stream. These micro-liquid particles can be referred to as acid aerosols which can be present at ppm levels. The present disclosure contemplates the removal of acid aerosols. These systems and/or methods include wet wall heat exchangers, impingers with inert reticulated carbon foam, and precipitators for example.

In accordance with the above, the non-condensing economizer can operate above dew point temperature, preventing any liquid condensate from forming. Without condensation, this economizer can be compatible with most plenum construction materials.

As described above, a condensing economizer can be provided downstream of the diverter (FIG. 4C) which extracts flue gas from the plenum and directs it on to the condensing economizer. Condensate from this condensing economizer can be chemically neutralized before proceeding to the building drain.

Referring next to FIG. 6, flue gas drying can continue with a blower 68 to increase pressure of flue gas from the diverter. This blower 68 can support flow through the heat exchanger/condenser 70 with can include a water outlet 71 operatively coupled to an acid quench assembly 74. Heat exchanger 70 can be configured to cool the gas below dewpoint to condense out most water leaving less than about 3% water or as low as approximately 0.2% water.

Heat exchanger 70 can be a tube and shell configuration, cooled by an external water/glycol loop provided from a chiller and/or water from the building cooling tower for example. As shown, the water removed from the system at heat exchanger 70 can be slightly acidic, and it is anticipated that the water can be neutralized before proceeding to a Publicly Owned Treatment Works (POTW) or through a sewer system. Additionally, some water will remain in the process stream as small micro droplets, mist, or acidic aerosols which will be minimized or removed with special heat exchanger designs, impingement devices, or possibly a precipitator.

After a preponderance of water has been removed, and acidic aerosols mitigated, the cooled flue gas 72 can continue on to a compressor to increase pressure of the flue gas to an optimum level of approximately 100 psig, or lower, as dictated by the PSA system specification.

Figure 7:
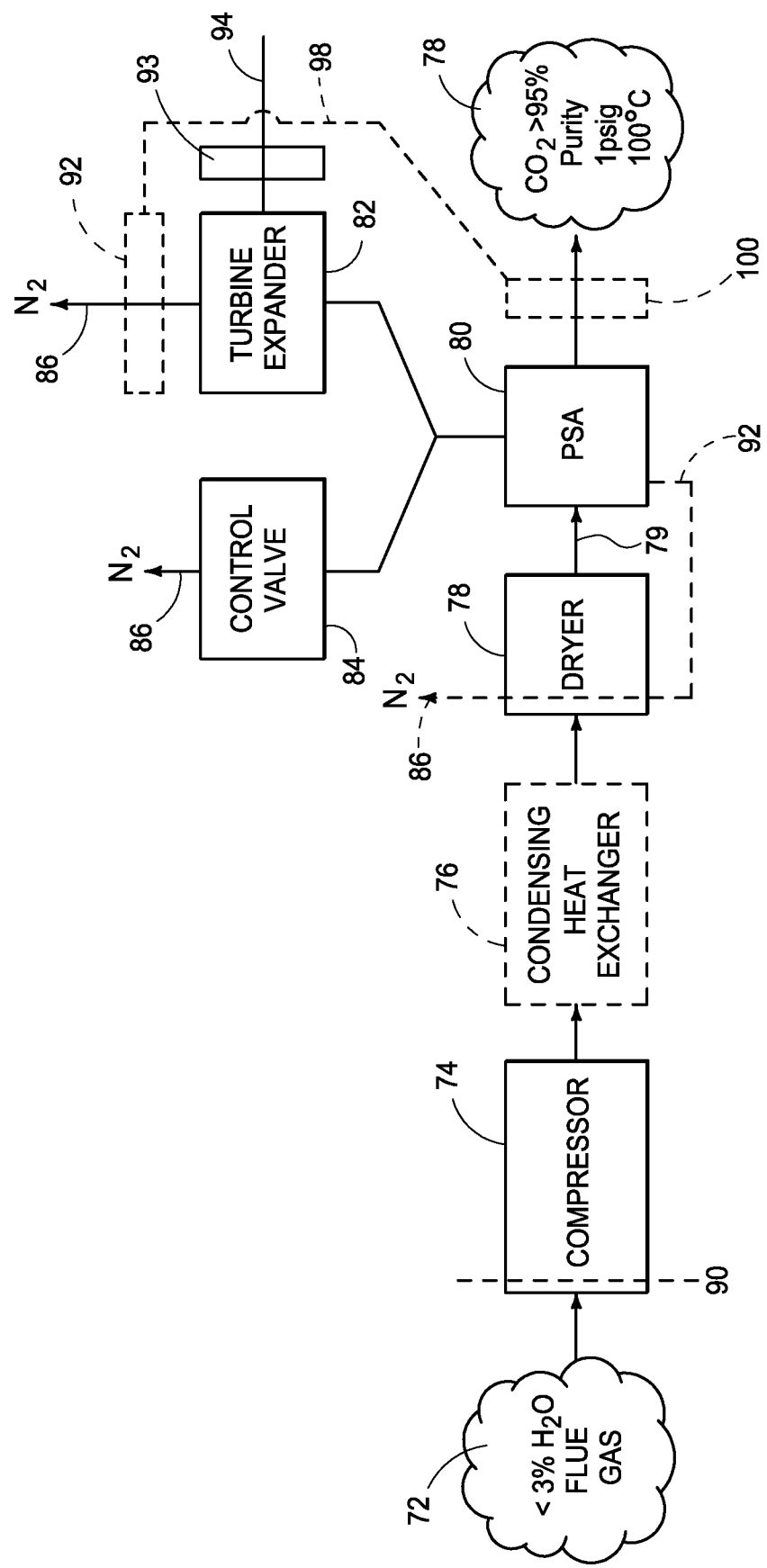
FIG. 7 is a portion of a carbon dioxide capture method and/or system according to an embodiment of the disclosure.

Referring next to FIG. 7, compressor 74 can receive flue gas 72. Compressor 74 can be an "oil free" compressor to eliminate downstream product contamination, and the compressor can be configured with variable frequency drives (VFD's) to respond to variable gas flows. Compression can raise the temperature of the flue gas, so a second heat exchanger 76 can be utilized to lower the temperature of the flue gas to less than 40° C. At this stage, the gas can have less than about 3% water which can exist as a vapor, the gas can be less than 40° C. temperature, and can be about 100 psig in pressure.

Figure 8:
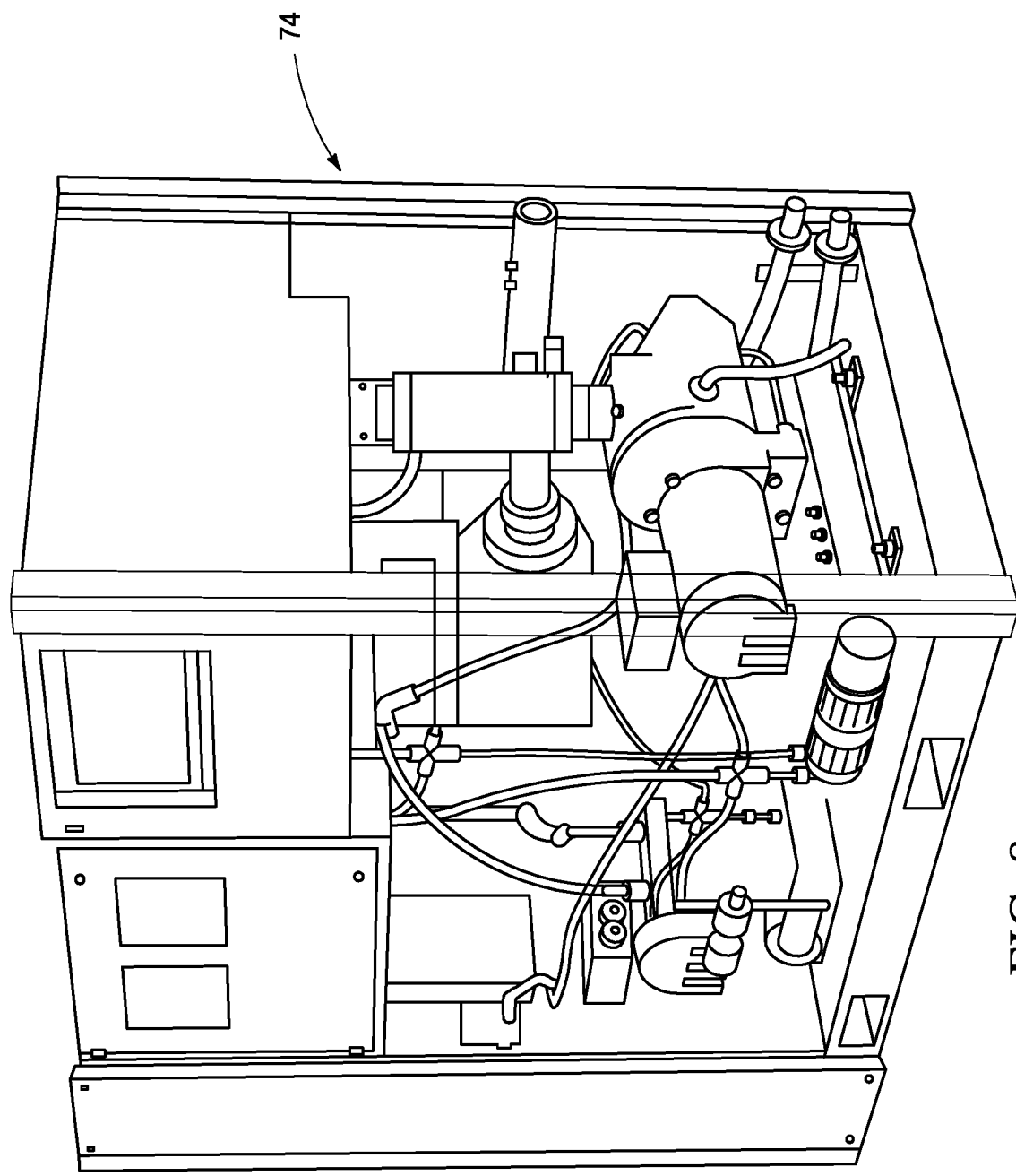
FIG. 8 is a is an example configuration of a component of a carbon dioxide capture method and/or system according to an embodiment of the disclosure.

Referring to FIG. 7, the systems and/or methods for separating carbon dioxide from flue gas generated from a combustion boiler within a building can include providing flue gas 72 having less than about 3% water; compressing the flue gas; and cooling compressor 74 with a heat transfer fluid 90 and providing the heat transfer fluid to/from a chiller and/or a cooling tower. An example compressor is depicted in FIG. 8. The heat transfer fluid can be water for example, and the water of the chiller can be cooled within a cooling tower of the building before returning spent heat transfer fluid to the chiller. Accordingly, the systems and/or methods of the present disclosure can include additional separation, liquefaction, storage, and/or transport. This is just one example of the heat generating components of the system that can be cooled with chiller and/or cooling tower heat transfer fluid. Over 70% of the cooling requirement for the systems and/or methods of the present disclosure can come from heat generated in compressors and/or pumps, and from heat exchangers on the liquefaction skid. Each of these components can be provided with a water cooling circuit supplied from a local chiller or directly from the central chiller. The local chiller can be water cooled with a water loop coming from the central chiller or from cooling water from the building cooling tower. The central chiller can be designed to prioritize heat transfer in the following order: a) domestic hot water makeup; b) cooling tower; c) exchange with outside air, for example.

Referring again to FIG. 7, after compression the flue gas can be provided to a dryer 78, such as a desiccant dryer. Dryer 78 can be operatively engaged with a nitrogen feed, such as a sweep feed, configured to regenerate spent desiccant. Typically, the dryer is a two-chamber cycling device, wherein one chamber is drying while the other chamber is re-generated for drying, and those cycles continue. The nitrogen can be provided to spent desiccant in one chamber while the other chamber is drying flue gas. Accordingly, systems and/or methods for separating carbon dioxide from flue gas generated from a combustion boiler within a building are provided that can include drying the flue gas using nitrogen recovered during separation of carbon dioxide recovered from the flue gas. This recovered nitrogen can be conveyed from the pressure swing adsorption assembly 80 via conduit 92 to dryer 78 and then exhausted through the stack 86. In accordance with example implementations, the dried flue gas can be provided for additional separation, liquefaction, storage, and/or transport.

From the dryer, the flue gas 79, containing less than 10 ppm water, can proceed to pressure swing adsorption (PSA) assembly 80. This pressure swing adsorption assembly can provide greater than 85% $CO_2$ recovery, at greater than 95% purity, at 1 psig, and at 100° C. Maximum $CO_2$ output flow at this point can be approximately 40 SCFM. The remainder of the flue gas, mostly nitrogen may continue under pressure, and/or be split with a portion returning to dryer 78. Another portion of the nitrogen can proceed to a turbine expander 82/generator 93 which can provide electrical energy 94 and a cold output gas, at near ambient pressure. Additionally, a control valve 84 equipped with a silencer can be operationally aligned in parallel with expander 82/generator 93.

Accordingly, methods for separating carbon dioxide from flue gas generated from a combustion boiler within a building are provided that can include removing at least some of the nitrogen from the flue gas to produce greater than about 95% carbon dioxide 78 using a pressure swing adsorption assembly 80. Nitrogen removed from the flue gas can be used to remove water from the flue gas before providing the flue gas to the pressure swing adsorption assembly, in dryer 78, for example. Alternatively, or additionally, at least some of the nitrogen removed from the flue gas can be provided to a gas expander/generator. Alternatively, or additionally one part of the nitrogen from the PSA can be provided to a control valve equipped with a silencer and providing another part to the expander/generator. In accordance with example implementations, the systems and/or methods of the present disclosure can include separating the nitrogen into parts and providing one part to the dryer and another part to the expander/generator. In one example implementation, the one part is about a third of the nitrogen from the pressure swing adsorption assembly.

Systems and/or methods are also provided for cooling carbon dioxide separated from flue gas generated from a combustion boiler within a building using the nitrogen exhaust of a PSA. The systems and/or methods can include separating nitrogen from flue gas using pressure swing adsorption assembly 80, and expanding the nitrogen through a turbine within the presence of a heat exchanger 92 to cool fluid within heat exchanger 92; and transferring that cooled fluid to another heat exchanger 100 operably aligned with the carbon dioxide product of the pressure swing adsorption assembly to cool the carbon dioxide product 78. The turbine can be part of a generator 93, for example, or may be provided to cool exchanger 92.

Typically, the nitrogen gas exiting the PSA can be at least 85 psig. with a flow exceeding 65% of the rated system flow. In accordance with example implementations, the nitrogen may be processed and saved as a marketable product. With regard to the electricity generation, grid compatible power conversion will be needed. The turbine generator will have a 500 Hz output which is not compatible with a 60 Hz grid. Therefore, it is envisioned that appropriate power conversion will be specified. This can be rectification followed by DC to AC multi phase inverter with proper safety features in case of a building power outage. After use in the turbine generator, and in the $CO_2$ heat exchanger, the nitrogen waste gas can proceed back to the exhaust stack or plenum.

Figure 9:
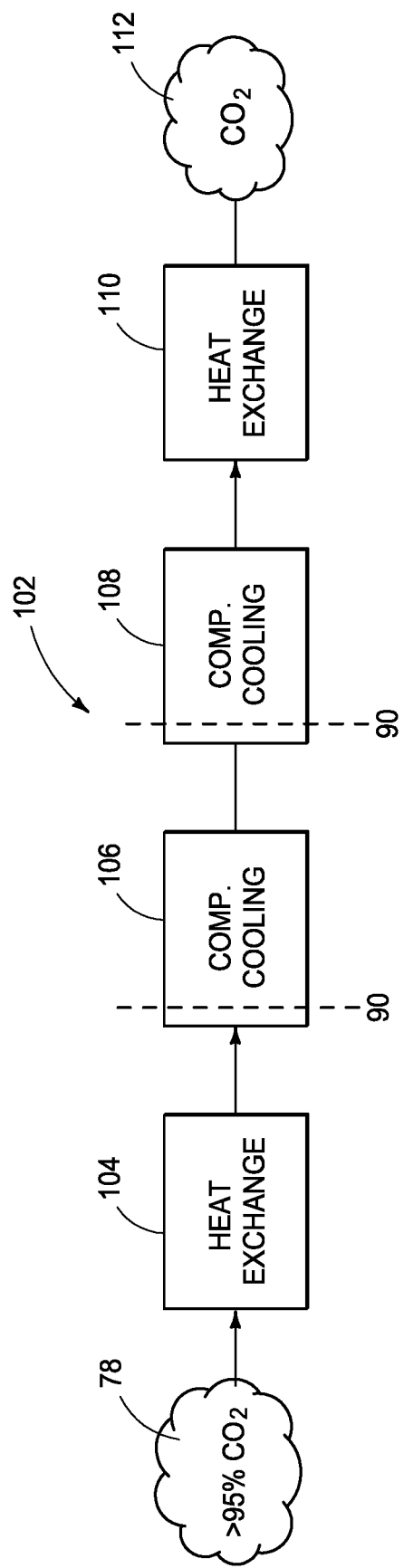
FIG. 9 is a portion of a carbon dioxide capture method and/or system according to an embodiment of the disclosure.

Referring next to FIG. 9, in another series of components of the present disclosure, the >95% pure $CO_2$ 78 can be cooled and compressed in sequential steps as shown in heat exchangers 104, compressors 106 and 108, and heat exchanger 110 with compressors operatively engaged with cooling transfer fluid 90 to approach the phase change state for liquefaction. In accordance with example implementations, the >95% pure $CO_2$ can have a temperature coming out of the PSA of as high as 100° C. As described, a heat exchanger can be provided to lower the temperature of the gas to a sufficient temperature and then compress the gas to a higher pressure. In accordance with example implementations, heat removed from this $CO_2$ stream can be transferred through external water/glycol cooling loops back to a heat management system which will support preheating of makeup water as shown in FIG. 9A. It can also be provided to raise the temperature of nitrogen gas coming off of the PSA prior to expansion through the turbine. This can improve turbine efficiency by allowing full use of nitrogen flow before exceeding the COLD temperature output limit. This is just one of several examples of utilizing heat from system components at other portions of the system to derive a more efficient overall system. In accordance with FIG. 9, there is a stepwise cooling and compression sequence of the $CO_2$ gas, which drives towards a final state of 311 psig and 0° F., at which point phase change occurs and the $CO_2$ becomes a liquid.

Figure 10:
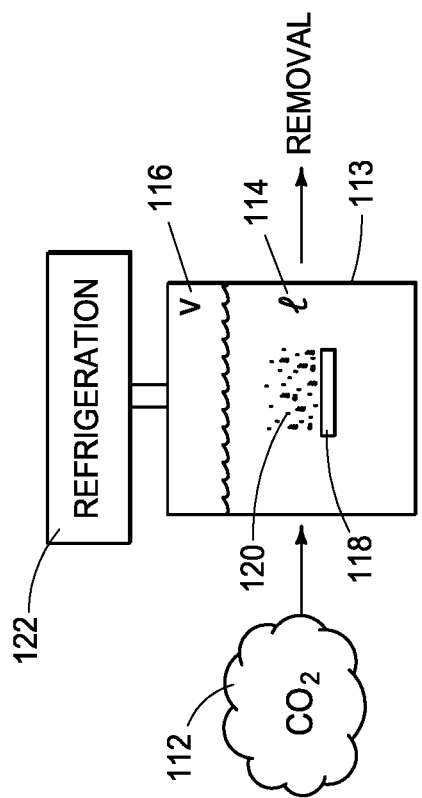
FIG. 10 is a portion of a carbon dioxide capture method and/or system according to an embodiment of the disclosure.

Referring next to FIG. 10, a $CO_2$ liquefaction and storage system and/or method is shown wherein $CO_2$ gas 112 is sparged inside a vessel 113 such as an insulated vessel. Example insulated vessels can include but are not limited to vacuum jacketed liquid storage tanks. Within this vessel, gas 112 can be converted to a liquid 114. In accordance with example implementations, gas 112 can be provided to sparge assembly 118 where it is provided as sparged gas 120 which liquefies upon sparging into liquid 114.

Vapor 116 at the top of vessel 113 is managed by a refrigeration system 122 which cools vapor 116, which condenses back to liquid 114, which returns back into vessel 113. In accordance with example configurations, system 122 can be configured as a loop in fluid communication with vessel 113 wherein vapor $CO_2$ 116 enters system 122 and returns to vessel 113 as a liquid $CO_2$ 114. In at least one configuration, system 122 is configured as a low temperature condenser equipped with an evaporator.

In the event of building power loss, the superior insulation of a vacuum jacketed tank, for example, may maintain liquid $CO_2$ for at least 30 days. In accordance with example implementations, the building itself may be able to tap into vessel 113 for a supply of $CO_2$ to extinguish fires; for example, fires related to electronic components that require $CO_2$ extinguishing methods.

With reference to FIGS. 1, 11, 12A, and 12B, in accordance with other example implementations, a $CO_2$ removal and/or delivery system is provided that can include off-take management using one or more vehicles provided in concert with $CO_2$ removal and/or delivery needs as provided by system control. For example, a removal and/or delivery truck 200 can be provided which transfers $CO_2$ directly from vessel 113 via a transfer pump 202 into a liquid $CO_2$ tank affixed to truck 200. The system can be configured to generate $CO_2$ pick up times based on numerous parameters, such as: vessel 113 capacity, system 10 $CO_2$ generation, legal date/time pickup windows; and/or $CO_2$ delivery needs. With respect to $CO_2$ delivery needs, it is contemplated that such high purity $CO_2$ can be delivered to a user directly without being warehoused or the need for additional purification. Just one example of direct delivery can be delivery to a wastewater treatment plant.

Figure 11:
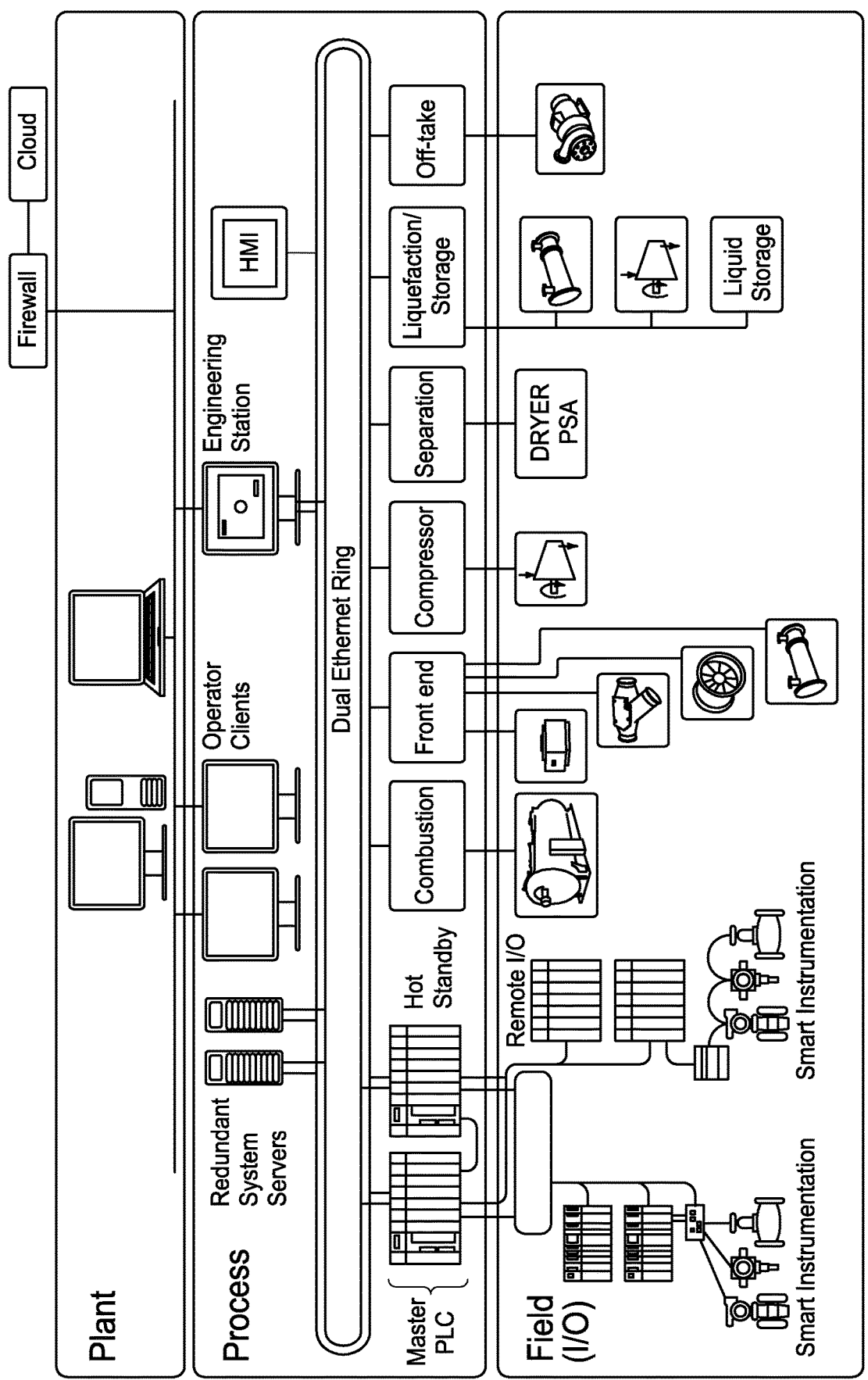
FIG. 11 is a portion of a carbon dioxide capture method and/or system according to an embodiment of the disclosure.

Referring next to FIG. 11, plant, process and field level components of a control system are shown. In accordance with an example implementation, an example overall control system is provided that shows combustion emission and control, MASTER PLC controller, the diverter, the compression, dryer, separation, cooling and compression, refrigeration/storage, and the providing of food grade $CO_2$. These systems are also coupled to utility systems of electricity, natural gas, and water. These control systems exemplify a basic Network Architecture Diagram. The MASTER PLC controls the entire plant with Ethernet loop connections and with Internet IP protocol communications to the Local Packaged controllers, and through direct connection and control to the digital and analog I/O field instrumentation level. The HMI server gathers data from the MASTER PLC, manages plant real time displays, executes logging, data management applications, and communicates through the secure firewall to external users. Also implied is the Engineering Development workstation which maintains all operational software and updates which are periodically downloaded to the MASTER PLC.

Figure 12A:
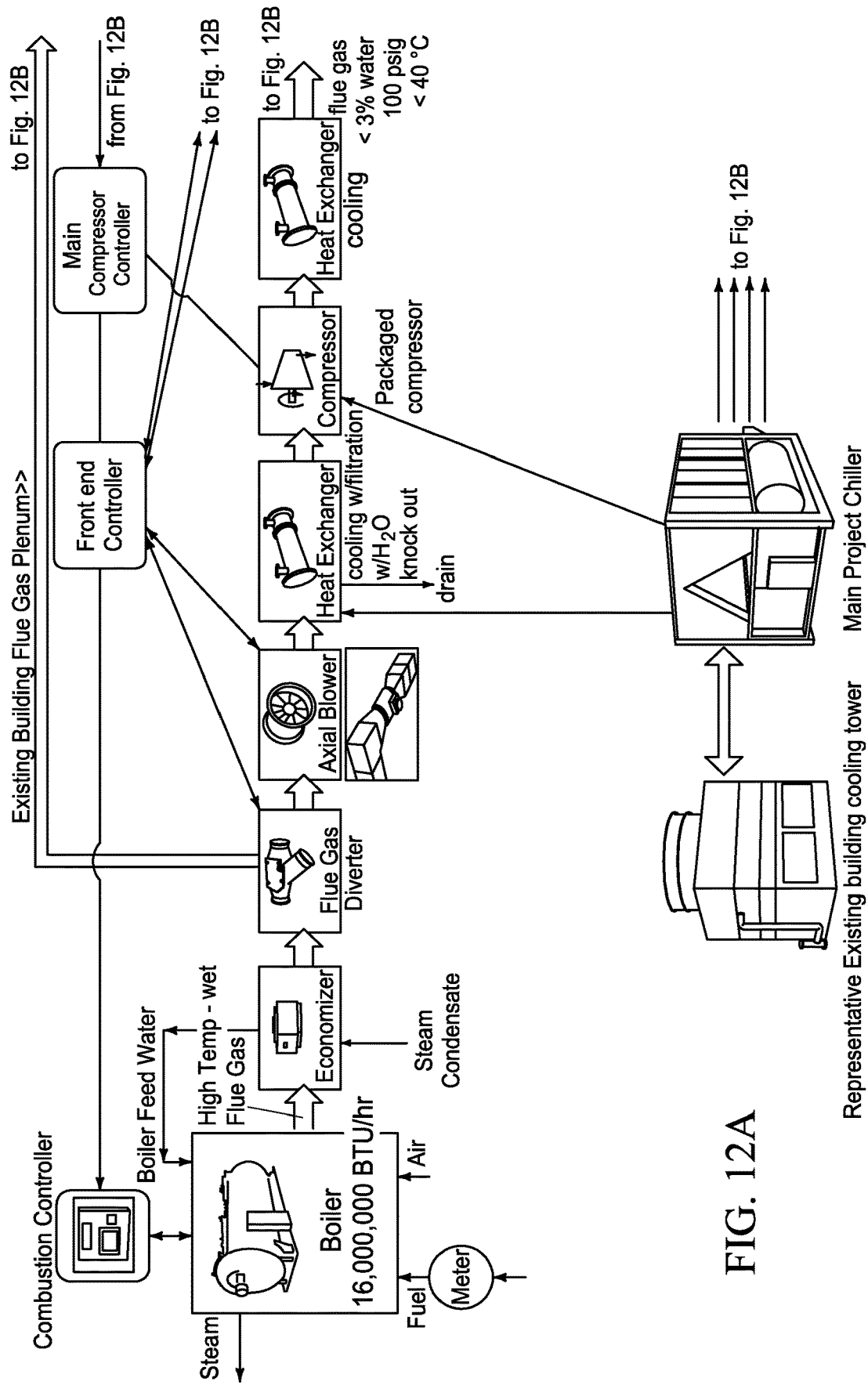
FIG. 12A is a portion of a carbon dioxide capture method and/or system according to an embodiment of the disclosure.
Figure 12B:
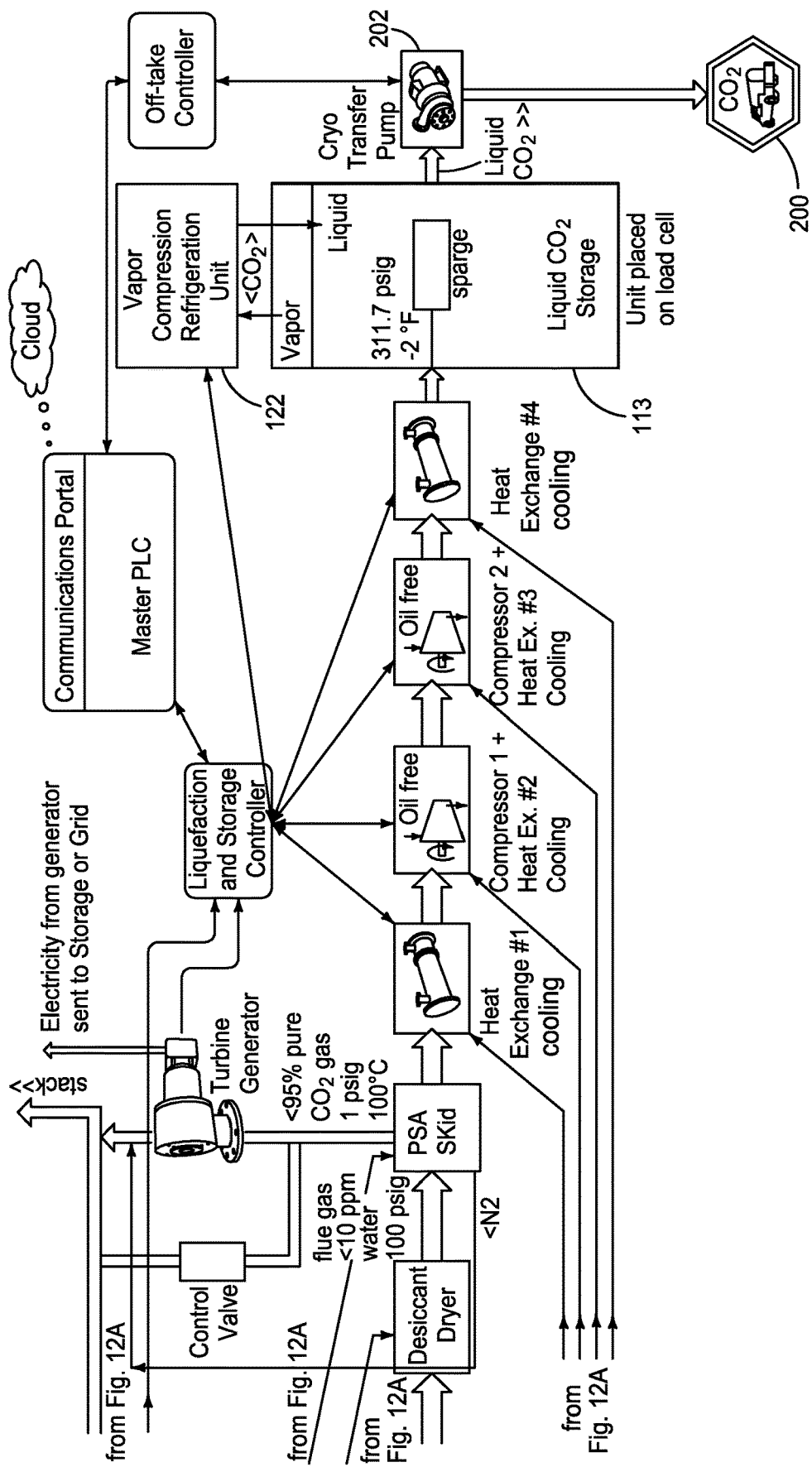
FIG. 12B is another portion of the carbon dioxide capture method and/or system of FIG. 12A according to an embodiment of the disclosure.

Referring to FIGS. 12A and 12B, an example implementation of the systems and/or methods is disclosed which details the sequence of the different components and processes described herein, as well as additional thermal management components that are associated with the building. As can be seen throughout the Figures and accompanying description, there are multiple places for heat to be transferred from different components of the disclosed system to existing building systems. For example, as shown, chillers can be in the building, as well as existing cooling towers.

These active cooling components can be operably coupled with heat being removed from process components via individual cooling loops. In accordance with example implementations heat, sometimes referred to as waste heat, can be transferred to building systems which can use extra heat to operate more efficiently. Therefore, regarding waste heat from the disclosed system, design preference is to transfer waste heat, firstly to building steam and hot water makeup systems, secondly to the building cooling tower, and finally to an appropriate chiller with heat exchange to air.

As shown in FIGS. 11 and 12A-B, a thermal management system (see, eg., MASTER PLC, controllers, etc.) can conserve use of fuel such as natural gas in the boiler by optimizing the combustion with the combustion controller, control water removal from the flue gas with the front end controller, perform additional separation with the dryer and PSA with the separation controller, liquefy and store $CO_2$ with the liquefaction/storage controller, and dictate off-take to a pickup and/or delivery truck with the off-take controller. These and additional controllers can work to control boiler feed water, potable and/or industrial water, chiller water, and/or cooling tower water, as well as nitrogen expansion cooling to reduce and/or eliminate heat loads in the system. Accordingly, flue gas can be cooled for water knockout, and heat generating electrical components such as compressors, blowers, pumps, and fans can be cooled as well.

In accordance with example implementations, the systems and/or methods of the present disclosure can include an energy storage system that can be configured to include a power conversion component and/or a battery or battery bank component. As one example, energy can be generated via turbine expansion of the nitrogen and this energy can be converted and stored within the building. The energy may be converted and provided directly to system components, for example compressors, and/or provided to the system components after storage, thus lowering building energy demand. Additionally, the energy may be provided to the power grid associated with the building itself.

In accordance with example implementations, using the MASTER PLC, energy generated with the system can be utilized during "peak demand" times (when, for example electricity rates are higher) and/or when the building is utilizing a "peak" amount of power. During these times, the MASTER PLC is monitoring building demand and then modify the system parameters to efficiently use energy storage and/or change carbon dioxide separation, liquefaction, storage, and/or transport to lower energy consumption during "peak demand" thus providing energy cost savings.

Example implementations of the systems and/or methods of the present disclosure can provide not only a carbon capture system but also an improvement in overall building energy efficiency (both thermal and electrical) while lessening $CO_2$ emissions. Example implementations can include lowering carbon fuel consumption through optimizing boiler combustion, providing warmer boiler feed water thus requiring less energy to heat the boiler feed water, warming potable or process water thus requiring less energy to the heat the potable or process water, generating electrical energy and using same to power system components, and/or using building cooling towers to reduce building thermal load, etc., which individually and/or collectively can be part of systems that dramatically improve building efficiency.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A method for operating a combustion boiler to optimize removal of the $CO_2$ from the combustion flue gas within a multi-unit residential or commercial building that is operably engaged to provide steam upon demand from at least one unit within the multi-unit residential or commercial building using domestic water to provide the steam for hot water, and/or steam supplied radiant building heater, the method comprising:
   upon demand for hot water or building heat by the at least one of the multi-unit residential or commercial building occupants providing air and natural gas to the combustion boiler;
   using the combustion boiler to receive domestic water and provide heated water for use by the building occupants and/or steam to provide radiant heat for the residential or commercial building;
   monitoring the amount of free oxygen in a combustion burner of the combustion boiler;
   controlling the amount of air and natural gas provided to the combustion burner to maintain a free oxygen amount in the combustion burner greater than 3% and combust the air and natural gas within the combustion burner to generate flue gas from the combustion burner, wherein the flue gas generated from the combustion burner has a $CO_2$ concentration of at least about 10% and a water concentration of about 18%; and
   compressing and drying the flue gas to remove water from the flue gas to achieve a water concentration at or below 10 ppm before separating $CO_2$ from $N_2$ then liquifying the $CO_2$ separated from the flue gas.

2. The method of claim 1 further comprising storing the $CO_2$ after separating the $CO_2$ from the flue gas.

3. The method of claim 2 further comprising transporting the $CO_2$ after storing the $CO_2$.

4. The method of claim 1 wherein the free oxygen amount is between 3 and 7%.

5. The method of claim 1 wherein the $CO_2$ concentration in the flue gas is less than 12%.

6. The method of claim 1 wherein the $CO_2$ concentration in the flue gas is between 10 and 12%.

7. The method of claim 1 wherein the removing the water from the flue gas comprises increasing the concentration of the $CO_2$ in the flue gas.

8. The method of claim 1 further comprising providing the flue gas to a desiccant dryer to achieve the water concentration at or below 10 ppm.

* * * * *